United States Patent Office

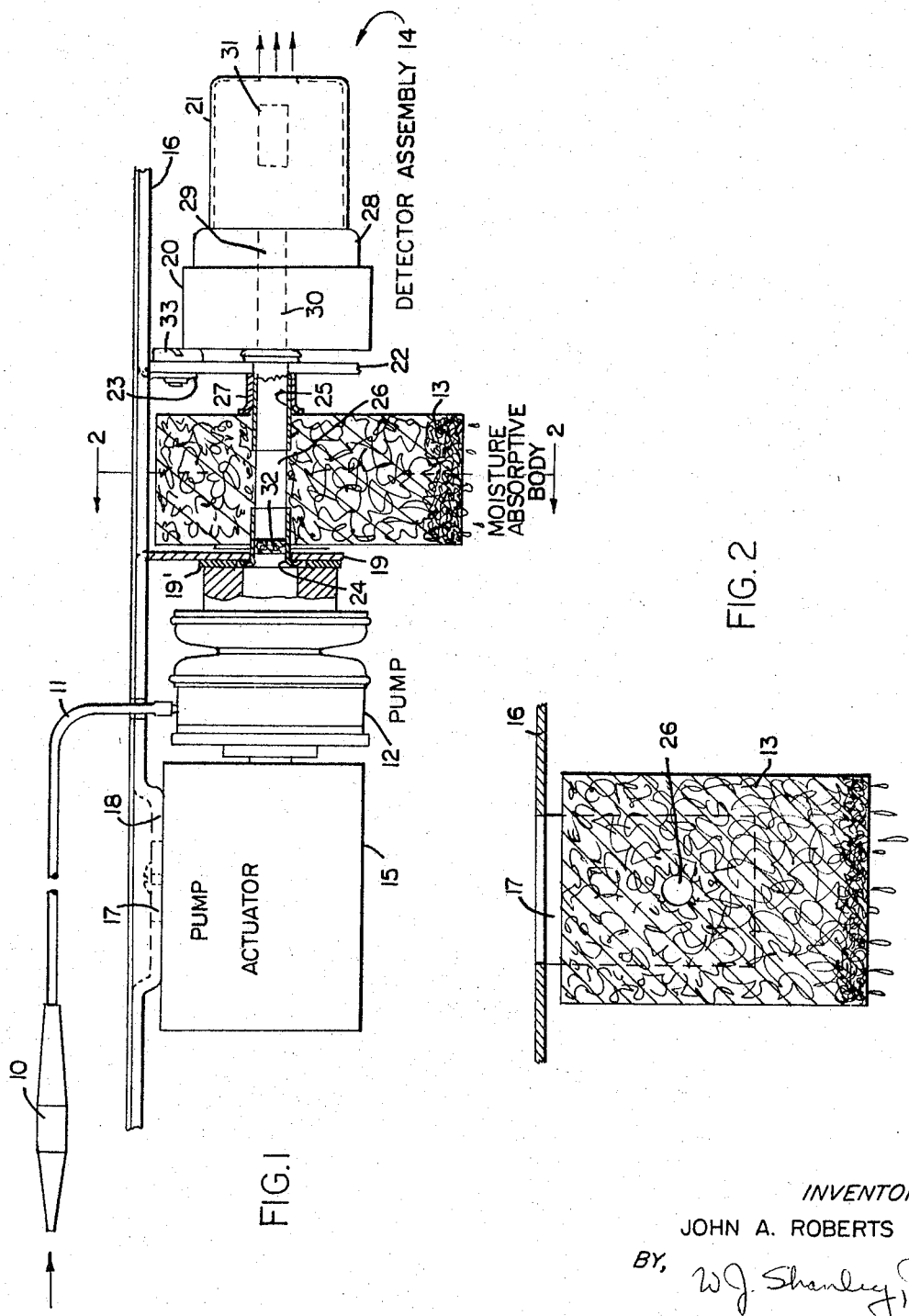

3,323,350
Patented June 6, 1967

3,323,350
LEAK DETECTOR
John A. Roberts, Lynnfield Center, Mass., assignor to General Electric Company, a corporation of New York
Filed Dec. 28, 1964, Ser. No. 421,336
7 Claims. (Cl. 73—40.7)

ABSTRACT OF THE DISCLOSURE

The disclosure reveals a leak detector which is protected against passage of entrained water in a sample to the detector system. A portion of the low velocity conduit in the detector system is constituted by a piece of moisture absorptive material having an aperture therethrough so that the aperture walls constitute a portion of the low velocity conduit and have substantially the same diameter as the low velocity conduit.

Background of the invention

This invention relates to improvements in leak detectors and more particularly to means for extracting water ingested into leak detecting systems.

Ingestion of water into the leak detector system commonly occurs in certain types of applications, e.g., testing for leaks in the air conditioning and refrigeration industries. Consequently, means must be provided in leak detectors used for such applications to prevent moisture from reaching the detector element and damaging it. This must be accomplished without substantially increasing the volume of the system, which would adversely affect response time.

Heretofore, it has been a common practice to provide gaps in a low-velocity portion of the conduit for conducting gas samples to the detector element in order to permit the escape of ingested water. Preferably, this gap was made as large as possible to prevent the water from bridging the gap at gas flow rates which were selected to provide the desired response time. This consideration calls for large flow rates in order to obtain good response times, and consequently, large gaps, of necessity, had to be utilized for effective water extraction. However, the presence of this gap has been the source of difficulties in prior art systems, which would become inoperative when the chassis assumes particular positions. This has been found to be attributable to a reversal of gas flow through the detector due to a "chimney effect" when the detector element is placed in or approaches an inverted position. It has been found that at some point as the detector approaches an inverted vertical position, hot gases will begin to rise through the detector element and overcome the forward motion of the gas sample imparted by the pump. When this occurs, the gases flowing due to the pump and the chimney effect will both be exhausted through the air gap which has been provided for water extraction purposes. Thus, in accordance with prior art leak detectors, a compromise had to be made between response time and water extraction of the system because of the "chimney effect."

It is therefore an object of this invention to provide a new and improved leak detector which has provisions for water extraction without subjecting the detector to the above-noted "chimney effect."

Summary

In accordance with my invention, I have eliminated the gap in the conduit for conducting gas samples between the probe and the detector and thus have eliminated the "chimney effect" by utilizing, as a portion of the conduit, a water-absorptive section which will extract moisture without substantially interfering with the gas-tight integrity of the conduit. This is accomplished without an adverse effect on response time, but on the contrary it is accomplished in such a manner as to permit the independent selection of gas flow rates which will provide the desired response time without necessity of compromising system water-extracting capabilities. In accordance with my invention, this is provided by locating the water-absorptive portion of the conduit at a point after the diffuser so that it will be located in the low-velocity and therefore low-pressure portion of the conduit.

It is another feature of this invention to treat the water-absorptive portion of the conduit with a wetting agent to assure that water will not be able to flow along the walls of the conduit across this absorptive portion.

For a better understanding of this invention, reference may be had to the following specification taken in view of the accompanying drawing.

Brief description of the drawings

FIGURE 1 is a schematic representation, partially in cross section, of a leak detector system in accordance with my invention; and FIGURE 2 is a sectional view taken along lines 2—2 of FIGURE 1.

Description of the preferred embodiment

Referring now to FIGURE 1, a leak detector, in accordance with my invention, is illustrated as comprising an input probe 10, a flexible section 11 of the gas sample conduit, pump 12, and a moisture-absorptive section of conduit 26 which is connected to the input of detector assembly 14. The entire assembly may be supported from chassis 16 in any convenient manner. For example, pump actuator 15 may be slidably received in a slot 17 in the depressed portion 18 of the chassis so as to permit the adjustment of the actuator with respect to pump 12 to vary the pumping rate in a well-known manner. The output end of pump 12 is, in turn, supported by punched-out supporting flange 19 in any convenient manner. Means is provided by gasket 19' for sealing the output side of pump 12 to supporting flange 19.

Reference may be had to my prior United States Patent 3,071,722, assigned to the same assignee, for details of construction of pump 12. It suffices here to say that this pump is a low-volume displacement type of pump which is suitable for incorporation into the conduits coupling the input probe and the detector element without adversely affecting response time. In accordance with that disclosure, the vacuum pump internal volume should be substantially smaller than the total volume of the conduit 11.

Detector assembly 14 is illustrated as comprising tube base 20 and detector element 21 which are supported in any convenient manner upon circuit board 22 which is, in turn, connected to punched-out supporting flange 23 by screw 33. Collars 24 and 25, which are held in supporting flange 19 and circuit board 22, respectively, provide means for supporting a body of moisture-absorptive material 13 having an aperture which forms moisture-absorptive section 26 of the conduit. An additional collar 27 is mounted upon collar 25 so as to space the moisture-absorptive body 13 a distance from circuit board 22 to prevent the moisture contained therein from coming into contact with circuit board 22.

Detector element 21 is illustrated as comprising a base portion 28 having an aperture 29 therein which is in communication with aperture 30 in base 20 and electrodes which define a region 31 for receipt of gas samples to be detected. The cross-sectional area of region 31 defined by the detecting element electrodes is illustrated as being approximately the same as the cross-sectional area of moisture-absorptive section 26, collars 24 and 25, and apertures 29 and 30 of detector assembly 14.

Felt disk 32, which is supported within collar 24, provides means for diffusing the gas samples appearing at the output of pump 12 and, in addition, provides means for eliminating the pulsating nature of the output gas stream of the pump and for inducing laminar flow. The diffuser may, for example, reduce the velocity of the gas stream from 6 feet per second in portion 11 to .6 feet per second in moisture-absorptive section 26. Thus, diffuser 32 not only reduces the velocity of the gas samples provided at the input of detector assembly 14 to thus provide optimum response time and sensitivity, but its location with respect to moisture-absorptive section 26 permits the utilization of a shorter moisture-absorptive section, thus enhancing response time without interfering with its moisture-extracting capabilities.

Moisture-absorptive body 13 may be treated with a wetting agent to assure that the water will not be able to flow between collars 24 and 25 across moisture-absorptive section 26. The moisture-extracting capabilities of moisture-absorptive body 13 can be made large enough to accommodate any amount of water which would be normally ingested into such a system by extending the lower part thereof downwardly a sufficient distance when the system is in its normal position so that any moisture being extracted will run to the bottom of body 13 where it can accumulate and drip off in a manner illustrated in FIGURE 2. Thus, there is no need for removing the system from operation in order to remove excess accumulated moisture.

It has been found that Dacron felt is suitable for utilization as diffuser 32 and moisture-absorptive body 13. When body 13 is treated with a wetting agent, e.g., Aerosol OT, moisture-absorptive section 26 may be made as small as ⅛ inch in length, assuming that the diameter of this section is ¼ inch and that diffuser 32 has reduced the flow rate to .6 foot per second. The location of moisture-absorptive body 13 on the output side of pump 12 in a low-pressure area not only assures the substantially gas-tight integrity of section 26, thus preventing the "chimney effect" from taking place under any conditions of orientation of detector assembly 14, but the pressure differential existing between the gas in conduit section 26 and the atmosphere aids in moving the moisture toward the exterior surfaces of the body. If greater gas flow velocities are required, then the length of the absorptive material conduit portion of the second conduit section can be increased proportionally to maintain the same moisture removal characteristics.

While a particular embodiment of the invention has been illustrated and described, various changes and modifications therein may be made by one skilled in the art; and therefore it is intended in the appended claims to cover all such changes and modifications as fall within the true spirit and scope of the invention.

What I claim as new and desire to secure by Letters Patent of the United States is:

1. In a leak detector system including probe means, conduit means, pump means, and detector means, the conduit means connecting said probe means, said pump means, and said detector means to direct air samples from said probe means through said pump means to said detector means, said conduit means having a first section of a first diameter connected to the probe and a second section of a second diameter greater than said first diameter connected to said detecting means and to said first conduit section, the improvement of means for removing water from air samples comprising a moisture absorptive piece of material having an aperture extending therethrough defining aperture walls, said aperture having a diameter substantially equal to said second diameter, said second conduit section having first and second separated portions inserted into opposite ends of said aperture through said material so that said aperture walls constitute a third portion of said second conduit section to direct gas therethrough while removing entrained water, said moisture absorptive body being located in a low velocity gas flow portion.

2. The combination of claim 1 further comprising diffuser means located between said third conduit portion and said first conduit section to substantially lower the velocity of gas flow past said absorptive portion from the velocity through said first conduit section and to induce laminar flow through said second conduit section.

3. The combination of claim 2 further comprising a vacuum pump coupled between said diffuser and said first conduit section.

4. The combination of claim 3 in which said piece of moisture absorptive material comprises a piece of felt treated with a wetting agent and extending downwardly a sufficient distance when the system is in its normal position to permit the extraction of moisture from the conduit by absorbing the moisture and letting it run to the bottom of said piece of felt where it can accumulate and drip off.

5. The combination of claim 4 in which said piece of felt has a predetermined thickness greater than the length of said absorptive, third conduit portion in the direction of gas flow, said absorptive portion presenting a substantially cylindrical surface which is defined by the surface of said aperture, the length of said absorptive portion being proportional to the velocity of gas flow in said absorptive portion.

6. The combination of claim 5 in which said detecting element comprises a region defined by detector electrodes for receipt of gas samples to be detected, the cross-sectional area of said region being substantially larger than the cross section of said first conduit section, and approximately the same as the cross section of said absorptive portion.

7. The combination of claim 6 in which said vacuum pump has an internal volume which is substantially smaller than the total volume of said conduit.

References Cited

UNITED STATES PATENTS

| | | | |
|---|---|---|---|
| 2,298,288 | 10/1942 | Gerrish et al. | 73—27 XR |
| 2,675,493 | 4/1954 | Grobel | 73—40.7 XR |
| 2,996,661 | 8/1961 | Roberts | 73—40.7 XR |
| 3,042,078 | 7/1962 | Rosell | 138—41 XR |

LOUIS R. PRINCE, *Primary Examiner.*

J. NOLTON, *Assistant Examiner.*